(12) United States Patent  
Sun et al.

(10) Patent No.: US 12,087,925 B2  
(45) Date of Patent: Sep. 10, 2024

(54) POWER SUPPLY SYSTEM

(71) Applicant: Hoi Tung Innotek (Shenzhen) Co., Ltd., Shenzhen (CN)

(72) Inventors: Xiaoliang Sun, Shenzhen (CN); Ping Lin, Shenzhen (CN); Zhiwen Xie, Shenzhen (CN); Anming Yang, Shenzhen (CN); Linmao Guo, Shenzhen (CN)

(73) Assignee: Hoi Tung Innotek (Shenzhen) Co., Ltd., Shenzhen (CN)

( * ) Notice: Subject to any disclaimer, the term of this patent is extended or adjusted under 35 U.S.C. 154(b) by 45 days.

(21) Appl. No.: 17/882,575

(22) Filed: Aug. 7, 2022

(65) Prior Publication Data

US 2022/0393261 A1    Dec. 8, 2022

Related U.S. Application Data

(63) Continuation of application No. PCT/CN2020/119570, filed on Sep. 30, 2020.

(51) Int. Cl.  
*H01M 10/625* (2014.01)  
*B60K 1/04* (2019.01)  
(Continued)

(52) U.S. Cl.  
CPC ............ *H01M 10/625* (2015.04); *B60K 1/04* (2013.01); *B60L 7/02* (2013.01); *B60L 50/64* (2019.02);  
(Continued)

(58) Field of Classification Search  
CPC ............ H01M 10/625; H01M 10/613; H01M 10/6562; H01M 50/249; H01M 50/242; H01M 50/298; H01M 50/204; H01M 10/46; H01M 10/482; H01M 2220/20; B60L 50/64; B60L 50/66; B60L 53/16;  
(Continued)

(56) References Cited

U.S. PATENT DOCUMENTS

| 5,390,754 A | 2/1995 | Masuyama et al. |
| 5,559,420 A * | 9/1996 | Kohchi .................. B60L 50/66 280/492 |

(Continued)

FOREIGN PATENT DOCUMENTS

| CN | 107264254 A | 10/2017 |
| CN | 206595313 U | 10/2017 |

(Continued)

*Primary Examiner* — Carlos Amaya  
(74) *Attorney, Agent, or Firm* — Nitin Kaushik

(57) ABSTRACT

A power supply system (10) is used for supplying power to a power system of an electric tractor and comprises a bracket (100) that is provided above and below a frame of a transport trailer, first cases (200) that are provided on the bracket and first power battery packs that are suspended inside the first case. Each of the first cases is provided with a first ventilation structure and a second ventilation structure (211) so that while the transport trailer is moving, wind can enter the first case from the first ventilation structure and be discharged from the second ventilation structure, thus achieving further cooling and heat dissipation for the first power battery packs and avoiding service life being impacted due to the first power battery pack overheating.

9 Claims, 6 Drawing Sheets

(51) Int. Cl.
  *B60L 7/02*      (2006.01)
  *B60L 50/60*     (2019.01)
  *B60L 50/64*     (2019.01)
  *B60L 53/16*     (2019.01)
  *H01M 10/46*     (2006.01)
  *H01M 10/48*     (2006.01)
  *H01M 10/613*    (2014.01)
  *H01M 10/6562*   (2014.01)
  *H01M 50/204*    (2021.01)
  *H01M 50/242*    (2021.01)
  *H01M 50/249*    (2021.01)
  *H01M 50/298*    (2021.01)
  *H02J 7/00*      (2006.01)

(52) U.S. Cl.
  CPC ............... *B60L 50/66* (2019.02); *B60L 53/16* (2019.02); *H01M 10/46* (2013.01); *H01M 10/482* (2013.01); *H01M 10/613* (2015.04); *H01M 10/6562* (2015.04); *H01M 50/204* (2021.01); *H01M 50/242* (2021.01); *H01M 50/249* (2021.01); *H01M 50/298* (2021.01); *H02J 7/0013* (2013.01); *H02J 7/0047* (2013.01); *H02J 7/0063* (2013.01); *H02J 7/007* (2013.01); *H01M 2220/20* (2013.01)

(58) Field of Classification Search
  CPC .. B60L 7/02; B60K 1/04; H02J 7/0013; H02J 7/0047; H02J 7/0063; H02J 7/007
  See application file for complete search history.

(56) References Cited

U.S. PATENT DOCUMENTS

| | | | |
|---|---|---|---|
| 9,834,183 B2* | 12/2017 | Moskowitz | B60L 50/66 |
| 10,737,583 B2* | 8/2020 | Johnsen | B60L 53/52 |
| 11,345,331 B2* | 5/2022 | McKibben | B60L 53/14 |

FOREIGN PATENT DOCUMENTS

| | | |
|---|---|---|
| CN | 107640215 U | 1/2018 |
| CN | 207449608 U | 6/2018 |
| CN | 209071444 U | 7/2019 |

* cited by examiner

POWER SUPPLY SYSTEM

CROSS-REFERENCE TO RELATED APPLICATIONS

The application claims priority to Chinese patent application No. 202020393380.0, filed on Mar. 24, 2020, the entire contents of which are incorporated herein by reference.

TECHNICAL FIELD

The utility model relates to the field of power supply systems, and in particular to a power supply system of an electric tractor.

An electric tractor is driven by a motor and used for short-distance horizontal transport of goods in regional yards such as ports, materials are often stored in a trailer, and the tractor is needed to solve the efficient transport of materials in different sections. At present, when enterprises use the electric tractors powered by electric energy, the tractors are required to work continuously because of the demand of working conditions in wharf operation, frequently start with no load and heavy load, accelerate, suddenly stop, wait for a long time, and have various and complicated working conditions. The traditional electric tractor has insufficient battery installation space, limited battery configuration capacity, and limited working endurance mileage and working time, which cannot meet the requirements of long-term operation of the electric tractor, and affects working efficiency. In addition, the overall structure of the tractor is compact, battery installation positions are highly concentrated, a cooling air duct of a battery itself is limited, the heat of the battery cannot be discharged in time when the battery is working, it is prone to rapid temperature rise, and the service life of the battery is affected. If a large number of batteries are arranged on the body of the tractor, it will also increase the weight of the full vehicle and affects the power performance of the tractor, and meanwhile, potential safety hazards exist.

At present, the power supply system is generally arranged on the tractor and used for supplying power to the power system of the electric tractor so as to increase the endurance of the tractor. However, the above-mentioned power supply system is directly arranged on the frame of the tractor, which is not conducive to its heat dissipation and safety.

BACKGROUND

The purpose of the utility model is to provide a power supply system in the process of supplying power to a power system of an electric tractor so as to solve the technical problem that at present, the power supply system is arranged on the tractor and used for supplying power to the power system of the electric tractor, which is not conductive to the heat dissipation of the existing power supply system.

SUMMARY

To achieve the above purpose, the technical means adopted by the utility model is as follows:

a power supply system is used for supplying power to a power system of an electric tractor and comprises a bracket, first cases, and first power battery packs, wherein the bracket is provided above or below a frame of a transport trailer;

each of the first cases is arranged on the bracket, so that a gap is left between the frame and the first case, each of the first cases has a first side wall and a second side wall which are oppositely arranged, a first ventilation structure is arranged on the first side wall, a second ventilation structure is arranged on the second side wall, the first side wall and the second side wall are arranged in a direction parallel to the axis of the frame, so that while the transport trailer is moving, wind can enter the first case from the first ventilation structure and be discharged from the second ventilation structure; and the first power battery packs are suspended in the first cases and are used for supplying power to the power system.

The embodiment of the utility model has the following beneficial effects:

the first cases that contain the first power battery packs and the frame of the transport trailer are connected by means of the bracket, and the described power supply system prevents the first cases from being directly connected to the frame, such that a gap is present between each of the first cases and the frame so as to facilitate air flow for heat dissipation; the first case is provided with a first ventilation structure and a second ventilation structure, so that while the transport trailer is moving, wind can enter the first case from the first ventilation structure and be discharged from the second ventilation structure, thus achieving further cooling and heat dissipation for the first power battery packs and avoiding service life being impacted due to the first power battery pack overheating.

BRIEF DESCRIPTION OF DRAWINGS

In order to describe the technical solutions in the embodiments of the utility model or the prior art more clearly, drawings required to be used in the description of the embodiments or the prior art will be briefly introduced below. It is apparent that the drawings described below are only some embodiments of the utility model. Those of ordinary skill in the art may further obtain other drawings according to these drawings without creative work.

In the drawings.

DETAILED DESCRIPTION OF THE EMBODIMENTS

Figure 1:
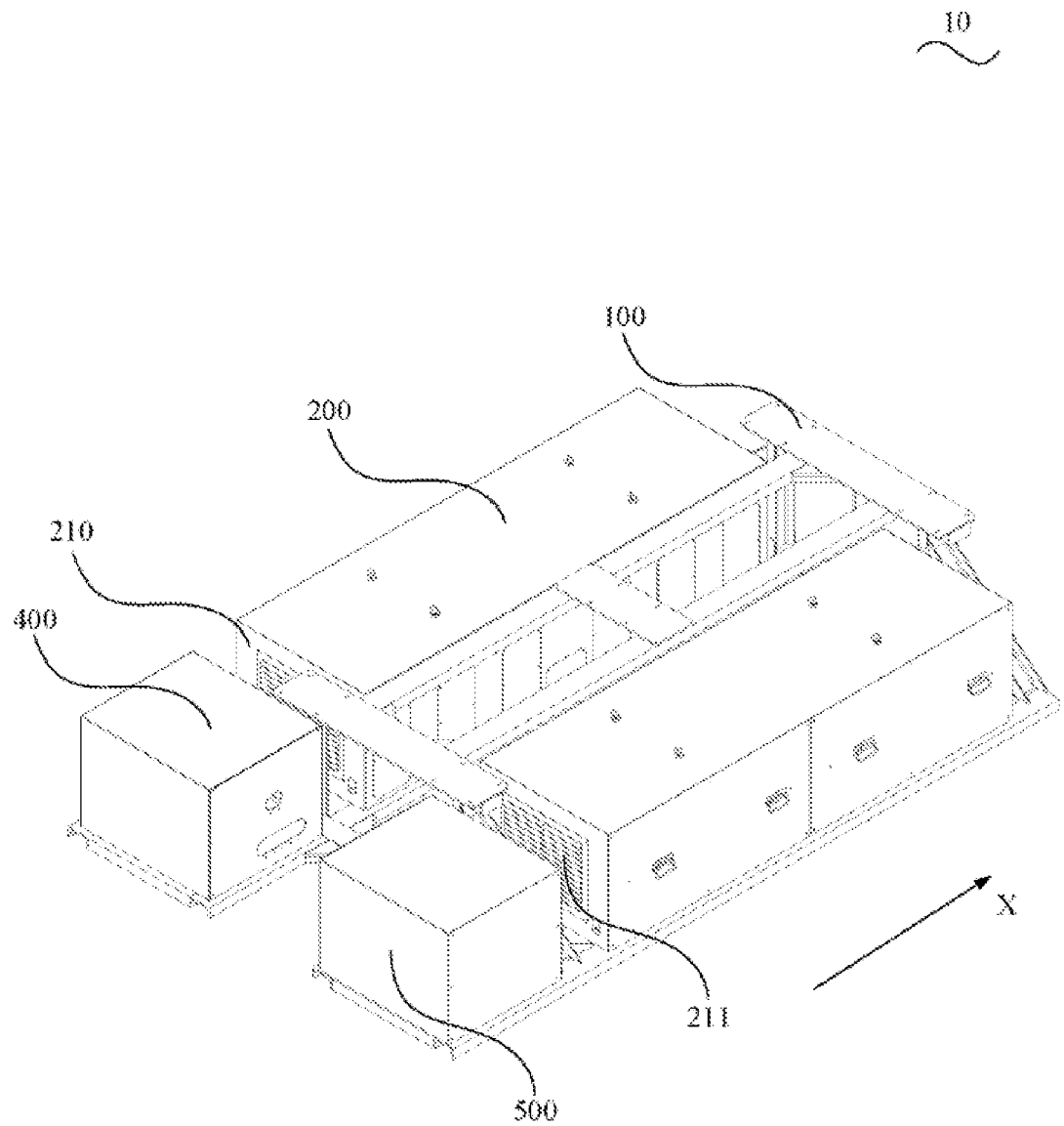
FIG. 1 is a schematic diagram of a power supply system in an embodiment.

The technical solutions in the embodiments of the utility model will be clearly and completely described below with reference to the drawings in the embodiments of the utility model. It is apparent that the described embodiments are only a part of the embodiments of the utility model, rather than all of the embodiments. All other embodiments obtained by a person of ordinary skill in the art based on the embodiments of the utility model without creative efforts shall fall within the protection scope of the utility model.

A power supply system provided by the embodiment of the utility model is used for supplying power to the power system of the electric tractor. Of course, in other embodiments of the utility model, the power supply system can also be used for supplying power to other power systems, which is not limited here.

Referring to FIG. 1 to FIG. 6 together, the power supply system provided by the utility model is described now. The power supply system 10 comprises a bracket 100 provided above or below a frame of a transport trailer, first cases 200 arranged on the bracket 100 and first power battery packs suspended in the first cases 200. The first power battery packs are used for supplying power to the power system. That is, after the electric tractor and the transport trailer are connected, the power system is powered by the first power battery packs for the operation of the electric tractor. When the electric quantity of the first power battery packs is too low, the transport trailer can be replaced, the first power battery packs on the replaced transport trailer can be charged, and the electric tractor can be connected to another transport trailer for continuous operation, thereby ensuring that a full vehicle can work 24 hours a day. The first cases 200 are connected to the frame through the bracket 100, and the first cases 200 are prevented from being directly connected to the frame, such that a gap is present between the frame and each of the first cases so as to facilitate air flow for heat dissipation of the first case. In the present embodiment, the number of the first cases 200 is two. The two first cases 200 are respectively located on the two sides of the axis of the frame. The first power battery packs of the same capacity and weight are respectively suspended in the two first cases 200.

As the transport trailer has sufficient space for loading the first power battery packs, the transport trailer can be configured with large-capacity battery packs, and the battery capacity of the power system is improved. Further, the endurance mileage and working time of the electric tractor are prolonged. The working efficiency of the electric tractor is improved. At the same time, as the trailer frame has relatively large space, the maintenance difficulty and the maintenance cost can be reduced, and the maintenance efficiency and the overall working efficiency of the electric tractor are improved.

In the present embodiment, compared with a technical scheme of placing the power supply system 10 on the sides and rear of a cab of the electric tractor and on both sides of a vehicle body, the technical scheme of assembling the power supply system 10 on the transport trailer has the beneficial effects that the power supply system 10 can be effectively protected, and is prevented from being impacted and crushed by the outside, and the safety performance of the power supply system 10 is improved.

The first cases 200 play a role in wrapping the first power battery packs, and improve the waterproof and dustproof capabilities of the first power battery packs. The first power battery packs are suspended in the first cases 200. A certain gap is left between each of the power battery packs and each of the first cases 200, so that the first power battery packs can be protected when an external object collides with the first case 200. At the same time, when the full vehicle works, the hidden danger that the first power battery packs collide with the first cases 200 and the transport trailer due to the vibration of the transport trailer is avoided. Further, shock-absorbing pads are arranged between the first cases 200 and the bracket 100. When the full vehicle is working, the anti-vibration capabilities of the first cases 200 and the first power battery packs are improved, and the service life of the entire power supply system 10 is prolonged.

Further, each of the first cases 200 has a first side wall (not shown) and a second side wall 210 which are oppositely arranged. The first side wall is provided with a first ventilation structure (not shown). The second side wall 210 is provided with a second ventilation structure 211. The first side wall and the second side wall 210 are arranged in a direction parallel to the axis of the frame, so that while the transport trailer is moving, wind can enter the first case 200 from the first ventilation structure and be discharged from the second ventilation structure 211, thus achieving cooling and heat dissipation for the first power battery packs. The axis direction of the frame is parallel to the direction indicated by an arrow x in FIG. 1.

Figure 2:
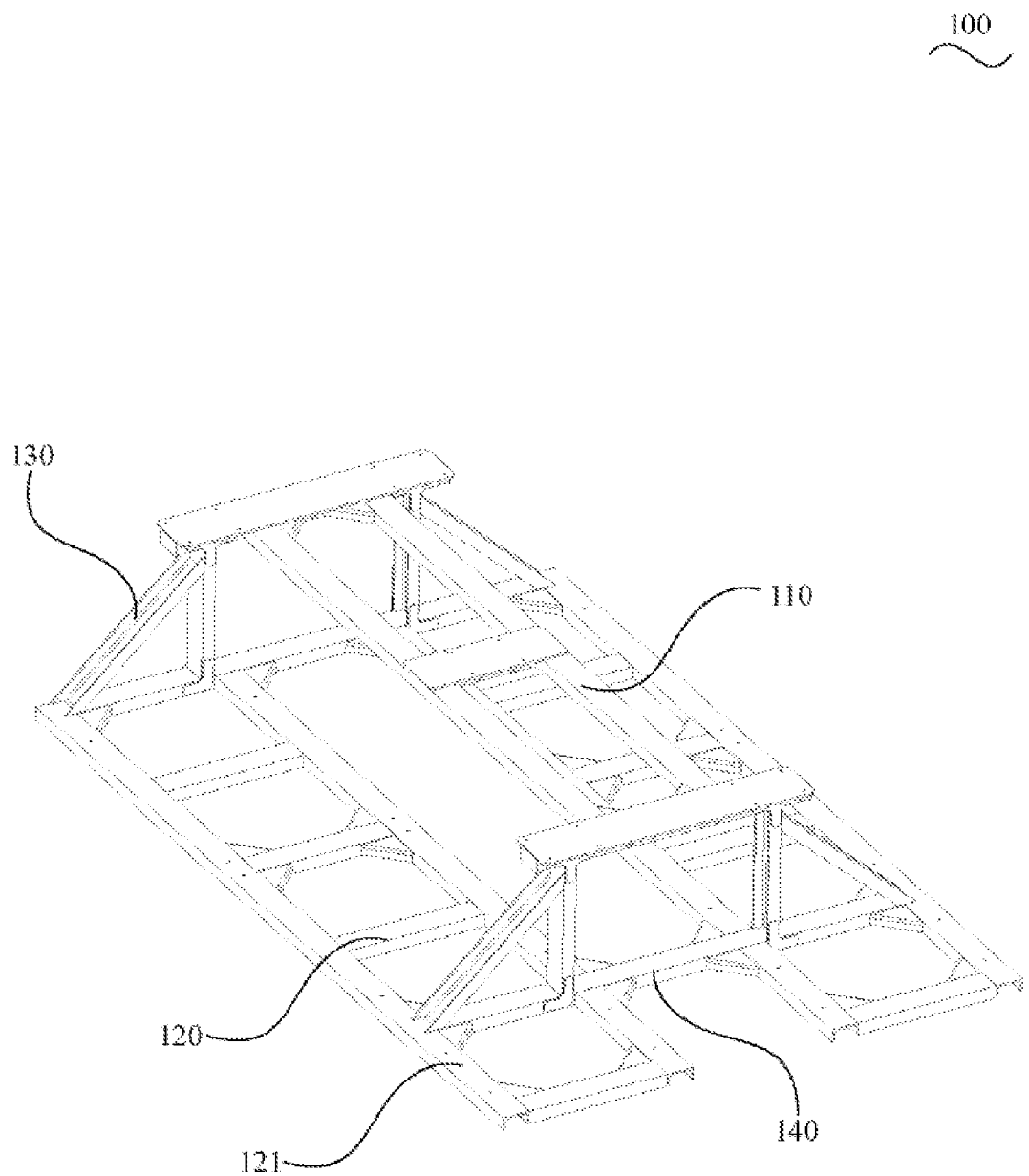
FIG. 2 is a schematic diagram of a bracket in the power supply system shown in FIG. 1.
Figure 6:
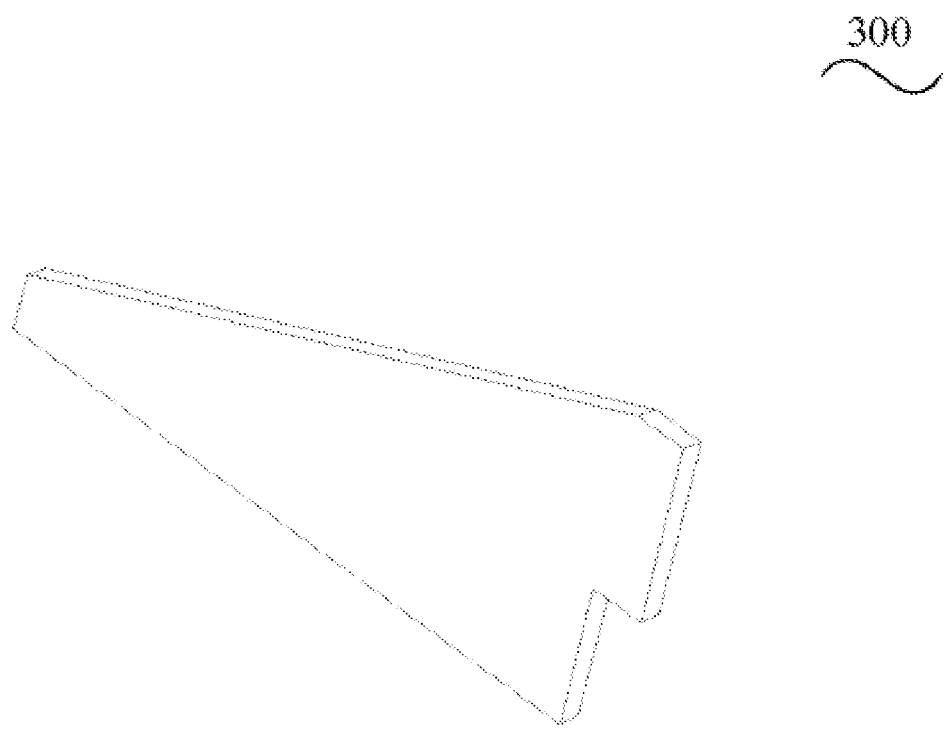
FIG. 6 is a structural schematic diagram of a reinforced rib plate in the power supply system shown in FIG. 1.

As shown in FIG. 2, in the present embodiment, the bracket 100 comprises an upper bracket body 110 and two lower bracket bodies 120. Each of the lower bracket bodies 120 is connected to the lower end of each of the first cases 200 in one-to-one correspondence. The upper bracket body 110 and the lower bracket bodies 120 are parallel to each other and connected by tripods 130. The lower bracket bodies 120 are connected by horizontal frames 140. The bracket 100 is connected to the frame through bolts. The connection position between the bracket 100 and the frame can be located at the front, middle or rear of the frame. Specifically, the upper bracket body 110 is connected to the frame by bolts. As shown in FIG. 6, in order to further increase the bonding force between the bracket 100 and the frame, a reinforced rib plate 300 may also be used for furthering reinforcing the upper bracket body 110 and the frame.

Figure 3:
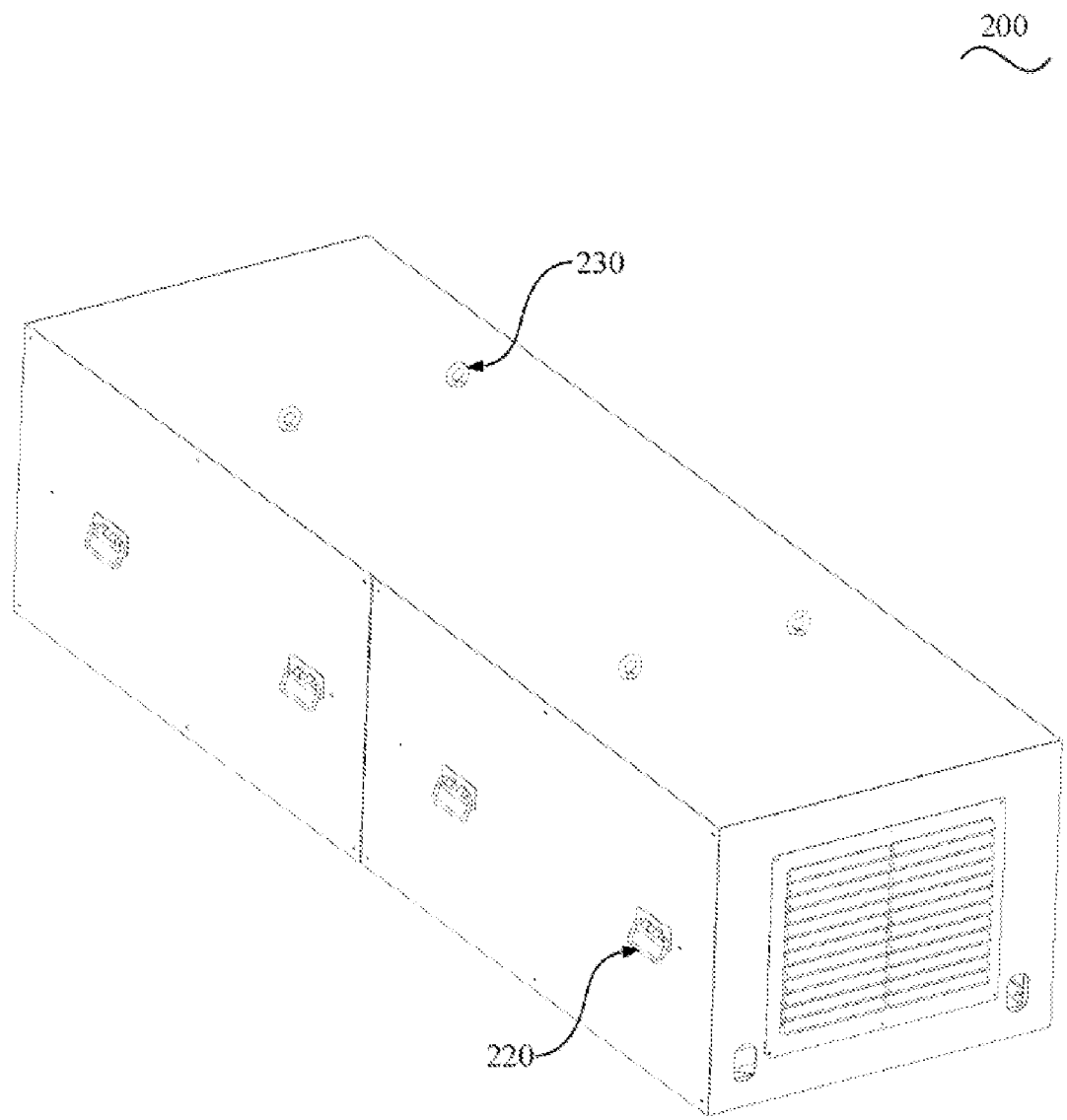
FIG. 3 is a schematic diagram of a first case in the power supply system shown in FIG. 1.
Figure 4:
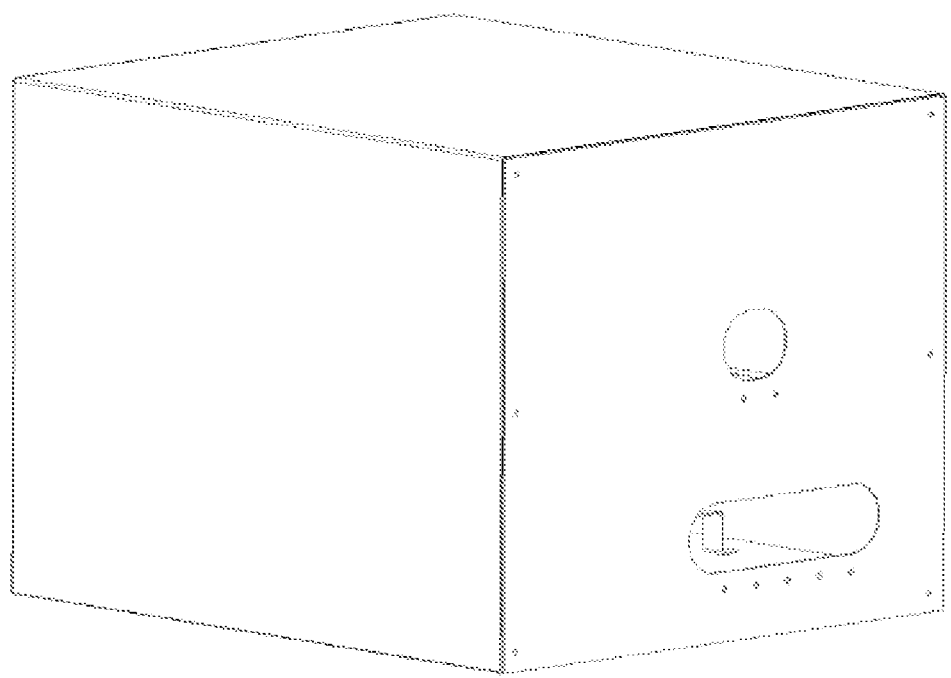
FIG. 4 is a schematic diagram of a second case/a third case in the power supply system shown in FIG. 1.

The installation space in each of the first cases 200 is sufficient, and each of the first power battery packs can form a good heat dissipation air duct, which ensures that the temperature of each of the first power battery packs is controlled in the optimal working range when the power supply system 10 is working. The service life of the power supply system 10 is prolonged. Further, the first ventilation structure and the second ventilation structure 211 are fence holes or louver holes 211. As shown in FIG. 3, in the present embodiment, the first ventilation structure and the second ventilation structure 211 are the louver holes 211. The louver holes 211 are used to prevent relatively large sundries from entering the first cases 200 to damage the first power battery packs under the premise of satisfying ventilation. Each of the first cases 200 is further provided with handles 220 and lifting lugs 230 for moving the first case 200.

Referring to FIG. 1 to FIG. 4 together, the power supply system 10 further comprises a second case 400 and a third case 500 which are arranged on the bracket 100. The high-voltage power distribution device is arranged in the second case 400. The first power battery packs are connected to the high-voltage power distribution device through high-voltage wiring harnesses and low-voltage control wiring harnesses. The first power battery packs supply power to the power system through the high-voltage power distribution device. The high-voltage power distribution device is used for acquiring the battery status information of the first power battery packs, and controls the first power battery packs to output power. The charging device is arranged in the third case 500 and is used for charging the first power battery packs. The second case 400 and the third case 500 are arranged, so that the high-voltage power distribution device and the charging device are independent. The stress of the entire power supply system 10 is avoided from being too concentrated, at the same time, the arrangement of the wiring harnesses is facilitated, and the maintenance convenience is improved when the power supply system 10 fails. In the present embodiment, the second case 400 and the third case 500 are arranged in one-to-one correspondence with the first cases 200 in an axial direction parallel to the frame. Specifically, the second case 400 and the third case 500 are connected to the extension portions 121 of the lower bracket bodies 120 in one-to-one correspondence. Both the second case 400 and the third case 500 are opposite to the corresponding second side walls 210 at intervals so as to facilitate air flow for heat dissipation.

After the transport trailer is connected to the electric tractor, the high-voltage power distribution device is used for connection with the power system. The first power battery packs supply power to the power system through the high-voltage power distribution device. When the electric tractor needs to operate, the high-voltage power distribution device receives the command sent by the full vehicle, responds, and controls the first power battery packs to output corresponding energy. Further, the power supply system 10 further comprises an energy recovery device. The energy recovery device is used for converting energy generated when the electric tractor 20 brakes into electric energy and for recovering the electric energy to the first power battery packs through the high-voltage power distribution device. The power supply system 10 supplies power to the power system 21 according to the set control strategy. Therefore, the endurance mileage of the electric tractor can be prolonged, the performance and safety of the electric tractor are not affected, and meanwhile, the overall working efficiency of the electric tractor can be improved.

Further, the charging device is provided with dual-gun charging sockets. The dual-gun charging sockets are used for connection with charging pile plugs to charge the first power battery packs. In the present embodiment, the dual-gun charging sockets face the outside of the transport trailer, which is convenient for external charging piles to charge the first power battery packs. The charging device transfers electric energy externally input to the first power battery packs for storage. The dual-gun charging sockets can satisfy the requirement that two charging piles charge the first power battery packs at the same time, and thus, the purpose of fast charging is achieved. Any one of the dual-gun charging sockets can also be selected for connection according to requirements for charging.

Figure 5:
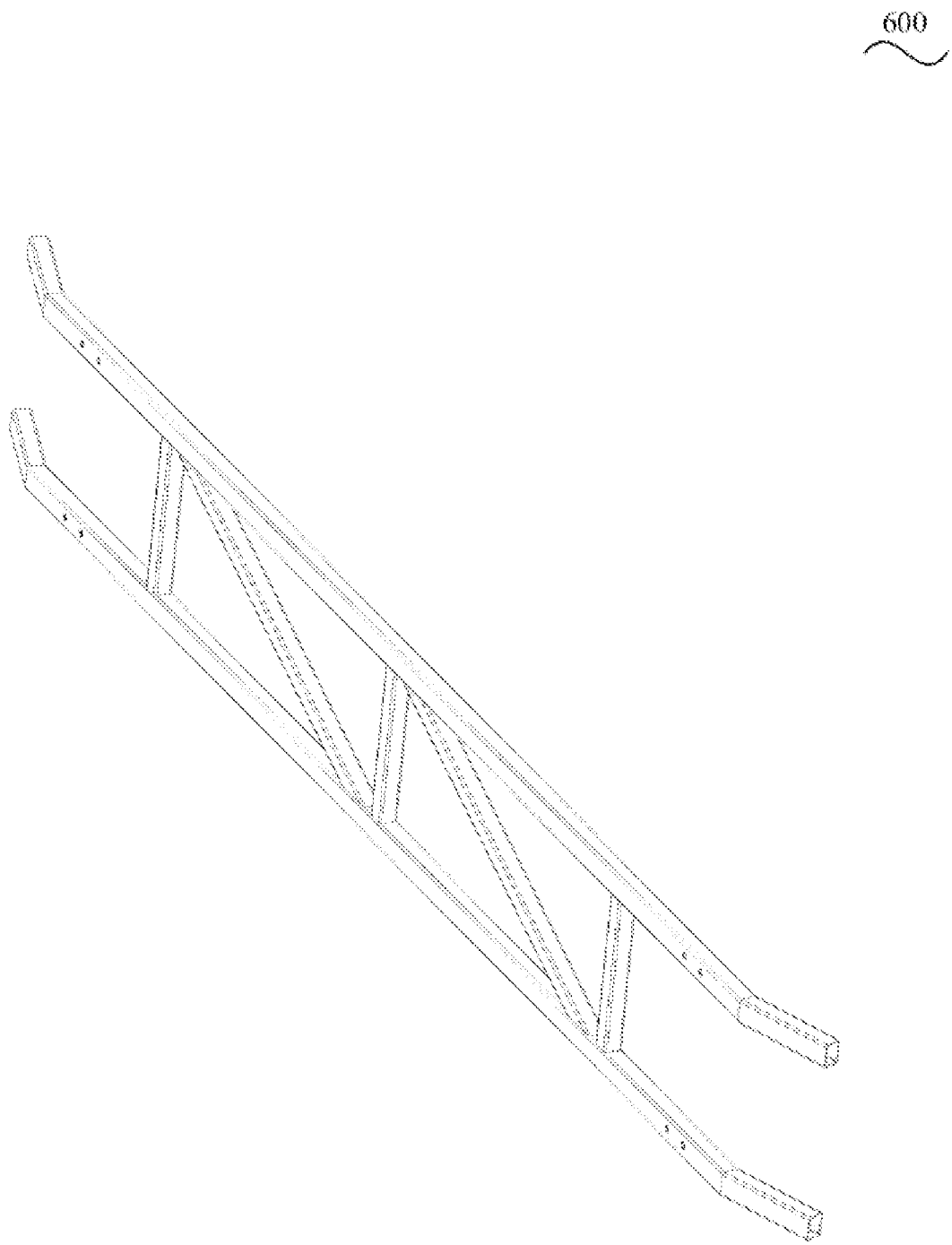
FIG. 5 is a schematic diagram of a protective fence in the power supply system shown in FIG. 1.

As shown in FIG. 5, the frame is also provided with protective fences 600 used for protecting the power supply system 10. The protective fences 600 are arranged on both sides of the trailer bracket to form external protection for the entire power supply system 10. The entire protective fences 600 form a wrapping state for the first cases 200, the second case 400 and the third case 500. The protective fences 600 are connected to the transport trailer without increasing the load bearing of the trailer bracket. At the same time, a certain gap is left respectively between the protective fences 600 and the first cases 200, between the protective fence and the second case 400 and between the protective fence and the third case 500 to protect the entire power supply system 10.

Further, the power supply system 10 also comprises a second power battery pack which is located on the electric trailer and used for supplying power to the power system. After the transport trailer is connected to the electric tractor for operation, the first power battery packs on the transport trailer serve as the main power sources, and can directly drive the power system to work. The power system can also be powered by the second power battery pack configured on the tractor itself.

In one specific embodiment, the power supply system 10 comprises the following working state:

1. quick start: the power supply system comprises the high-voltage power distribution device, the full-vehicle control module, the battery management module, the main drive motor control module, the DC/DC (direct current/direct current) power conversion module, and the three-in-one electrical accessory control module. The full-vehicle control module is a main data processing and logic control core component, is connected to and communicated with components of the battery management module, the main drive motor control module, the DC/DC power conversion module, and the three-in-one electrical accessory control module through vehicle-mounted CAN communication, and acquires relevant data information for processing and control interaction. The battery management module performs data acquisition and logic control on the voltages, electric quantity and temperatures of the first power battery packs through CAN communication. The electric tractor controls the power supply of the full vehicle through the full-vehicle control module, so that the vehicle can quickly enter the working mode.

2. smooth start: after the tractor is connected to the transport trailer, the first power battery packs supply power. The power system drives the electric tractor to travel, and the electric tractor starts smoothly and powerfully. There are no gear cases, no shifting process, and no power interruption, the electric tractor has continuous power, is easy to drive, and is comfortable to ride.

3. energy feedback: when a driver releases an accelerator, or depresses a brake pedal, or performs other braking actions, the power system generates braking resistance, and the generated energy is converted into electric energy to charge the first power battery packs. The energy recovered from the braking feedback can be used as power for assisting the power system and power in a pure electric mode.

4. external fast charging function: the electric tractor power source comprises the first power battery packs. The first power battery packs are charged by the charging device. The charging device is provided with the dual-gun charging sockets which are used for being connected to the charging pile plugs to charge the first power battery packs. The second power battery pack is equipped with a charging interface so as to be charged. When the electric tractor is connected to the transport trailer, the first power battery packs and the second power battery pack are connected in parallel through the high-voltage wiring harnesses to form a large-capacity battery pack. When the electric tractor is externally charged, the dual-gun charging sockets or charging interfaces can be connected to charge the first power battery packs and the second power battery packs as a whole. When the first power battery packs are disconnected from the second power battery pack, the first power battery packs or the second power battery pack can be charged independently through the dual-gun charging sockets or the charging interfaces.

In conclusion, compared with the conventional electric tractor with a large number of battery packs piled up on the sides and rear of the cab of the tractor as well as on both sides of a vehicle body, the power supply system provided in the embodiment of the present application has the advantages that the protection for the first power battery packs is improved, and the safety of the first power battery packs is greatly improved. At the same time, the space is relatively large, more power is supplied, and the endurance mileage and working time are prolonged. The inspection and maintenance of the batteries are also more convenient while the space is enlarged.

Moreover, due to the change of the first power battery pack arrangement mode, the first power battery packs have sufficient space for the arrangement of the air ducts, so that the temperature rise of the first power battery packs is relatively slow, the maximum temperature and average temperature during operation are reduced, and the failure rate is reduced. At the same time, the capacity fading of the first power battery pack becomes slow, and the service life of the first power battery pack is prolonged. Further, the arrangement space of the high-voltage wiring harnesses is enlarged, the high-voltage wiring harnesses can be separated from the low-voltage control wiring harnesses by a sufficient distance so as to prevent the electric tractor from being incapable of working normally due to the interference caused by communication, and the stability of the electric tractor is improved.

Aiming at the characteristics that the wharf electric tractor frequently starts with no load and heavy load, climbs, accelerates, stops suddenly, waits for a long time, works 24 hours a day, and has various and complicated working states, the power supply system 10 adopts lithium battery packs as the first power battery packs for power supply, the electric driving mode and braking energy recovery mode of the wharf electric tractor with pure lithium battery output are realized, the energy loss is reduced, and zero oil consumption and pollution emission of the electric tractor are completely realized.

What is mentioned above is only preferred embodiments of the utility model, cannot limit the implementation scope of the utility model for this reason, that is, all the equivalent changes made according to the claims of the utility model still belongs to the scope contained in the utility model

What is claimed is:

1. A power supply system, used for supplying power to a power system of an electric tractor, comprising a bracket, first cases and first power battery packs,
    wherein the bracket is provided above or below a frame of a transport trailer;
    each of the first cases is arranged on the bracket, so that a gap is left between a frame and each of the first case, each of the first cases has a first side wall and a second side wall which are oppositely arranged, a first ventilation structure is arranged on the first side wall, a second ventilation structure is arranged on the second side wall, the first side wall and the second side wall are arranged in a direction parallel to the axis of the frame, so that while the transport trailer is moving, wind can enter the first case from the first ventilation structure and be discharged from the second ventilation structure; and the first power battery packs are suspended in the first cases and are used for supplying power to the power system;
    wherein the power supply system further comprises a second case, a high-voltage power distribution device, a third case, and a charging device; and
    wherein a second case is arranged on the bracket,
    the high-voltage power distribution device is located in the second case, the first power battery packs are connected to the high-voltage power distribution device through high-voltage wiring harnesses and low-voltage wiring harnesses, the first power battery packs are used for supplying power to the power system through the high-voltage power distribution device, and the high-voltage power distribution device is used for acquiring the battery state information of the first power battery packs and controlling the first power battery packs to output power,
    the third case is arranged on the bracket, and the charging device is located in the third case and is used for charging the first power battery packs.

2. The power supply system of the claim 1, wherein the bracket is connected to the frame through bolts and reinforced rib plates.

3. The power supply system of the claim 1, wherein a shock-absorbing pad is arranged between each of the first cases and the bracket.

4. The power supply system of the claim 1, wherein the first ventilation structure and the second ventilation structure are fence holes or louver holes.

5. The power supply system of claim 1, wherein the power supply system further comprises an energy recovery device used for converting energy generated when the electric tractor brakes into electric energy and for recovering the electric energy to the first power battery packs through the high-voltage power distribution device.

6. The power supply system of claim 5, wherein the charging device is provided with dual-gun charging sockets which are used for connection with charging pile plugs to charge the first power battery packs.

7. The power supply system of claim 6, wherein the number of the first cases is two, the two cases are respectively located on two sides of the axis of the frame, and the second case and the third case are arranged in one-to-one correspondence with the first cases in an axial direction parallel to the frame; and
    both the second case and the third case are opposite to the corresponding second side walls at intervals.

8. The power supply system of claim 7, wherein the frame is also provided with protective fences for protecting the power supply system.

9. The power supply system of claim 8, further comprising a second power battery pack which is located on the electric trailer and used for supplying power to the power system.

* * * * *